United States Patent

Zona et al.

[11] Patent Number: 5,197,346
[45] Date of Patent: Mar. 30, 1993

[54] ARTICULATED ROBOT WITH TWO FOREARMS

[75] Inventors: Mauro Zona; Marco Bettinardi, both of Turin, Italy

[73] Assignee: Comau S.p.A., Turin, Italy

[21] Appl. No.: 827,754

[22] Filed: Jan. 29, 1992

[30] Foreign Application Priority Data

Feb. 15, 1991 [IT] Italy .................... T091A000112

[51] Int. Cl.⁵ .................................... B25J 17/00
[52] U.S. Cl. ........................... 74/479; 901/15; 901/8
[58] Field of Search .............. 74/479; 901/15, 23, 901/25, 26, 28, 29, 8

[56] References Cited

U.S. PATENT DOCUMENTS

| | | | |
|---|---|---|---|
| 2,978,118 | 4/1961 | Goertz et al. ............. | 901/28 X |
| 4,717,303 | 1/1988 | Kawai ........................ | 901/26 X |
| 4,762,455 | 8/1988 | Coughlan et al. ......... | 901/28 X |
| 4,780,047 | 10/1988 | Holt et al. .................. | 901/28 X |
| 4,829,840 | 5/1989 | Torii et al. ................. | 74/479 X |
| 4,922,782 | 5/1990 | Kawai ........................ | 74/479 |
| 4,955,250 | 9/1990 | Fisher ........................ | 74/479 |

FOREIGN PATENT DOCUMENTS

| | | |
|---|---|---|
| 0044548 | 2/1982 | European Pat. Off. . |
| 2638386 | 3/1985 | France . |
| 62-157737 | 7/1987 | Japan ........................ 901/28 |

*Primary Examiner*—Allan D. Herrmann
*Assistant Examiner*—William O. Trousdell
*Attorney, Agent, or Firm*—Fish & Richardson

[57] ABSTRACT

An articulated robot has an arm and two forearms which are articulated to the arm about the same axis and controlled by an independent means.

6 Claims, 2 Drawing Sheets

ARTICULATED ROBOT WITH TWO FOREARMS

The present invention relates to articulated industrial robots, that is, industrial robots each having at least one articulated arm on the distal end of which is an articulated wrist with a plurality of degrees of freedom. Articulated robots differ from so-called "cartesian" robots which have slides mounted for sliding relative to each other along perpendicular straight lines.

More particularly, the present invention relates to an articulated robot of the known type including at least one arm and a forearm which is articulated to the arm and is intended to have an articulated wrist, and means for rotating the forearm relative to the arm.

The object of the invention is to provide a robot of the type indicated above which is particularly versatile and suitable for carrying out even quite complex manipulatory operations (for example assembly and disassembly operations) quickly.

In order to achieve this object, the subject of the invention is a robot of the type indicated above, characterised in that it includes a second forearm which is articulated to the arm about the same articulation axis as the first forearm, and in that it has means for rotating the second forearm which are independent of the means for operating the first forearm.

The invention will now be described with reference to the appended drawings, provided purely by way of non-limiting example, in which.

With reference to the drawings, an articulated robot of the type which forms the subject of prior Italian patent application No. 67763-A/90 filed by the present Applicant is generally indicated 1. However, the invention may also be applied to any other type of articulated robot.

Figure 1:
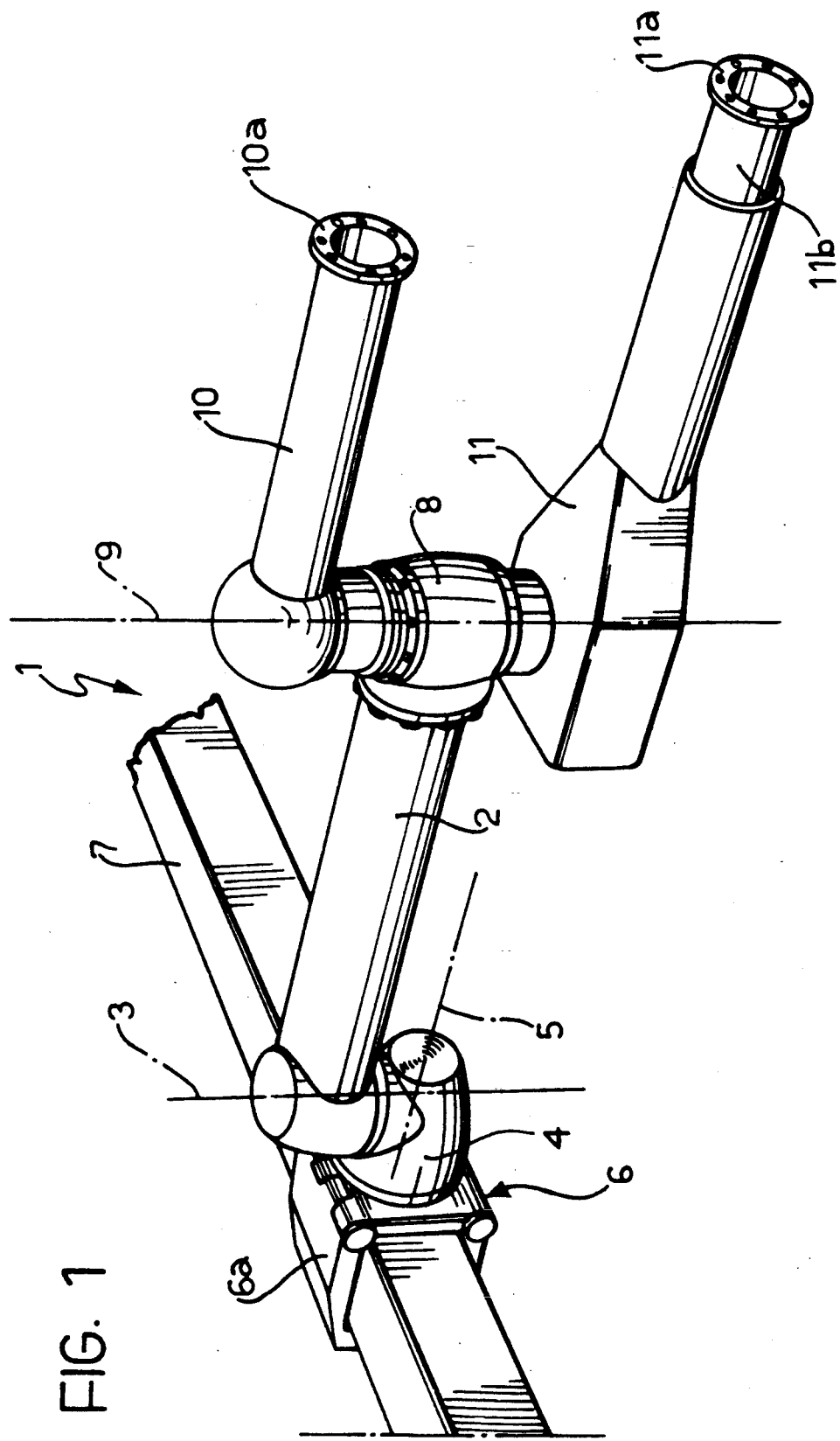
FIG. 1 is a perspective view of a robot according to the present invention.

With reference to FIG. 1, the robot 1 includes an arm 2 which is articulated about an axis 3 on a support structure 4 which in turn is articulated about an axis 5 perpendicular to the axis 3 on a slide 6 which is slidable on a support beam 7 and has movable jaws 6a for its rapid mounting on the beam 7, as provided for in the present applicant's Italian patent application mentioned above and in his further Italian patent application No. 67760-A/90.

According to the invention, the distal end portion 8 of the robot arm 2 supports first and second forearms 10, 11 in a manner such that they are articulated about the same axis 9, each forearm having a flange 10a, 11a at its end for the attachment of an articulated wrist. The structure of the wrist is not shown in the appended drawings since it may be of any known type and, in any case, does not fall within the scope of the present invention.

As can also be seen in FIG. 1, the second forearm 11 has a telescopic structure with a portion 11b which can be extended so that the range of operation of the wrist carried by the second forearm can be adjusted.

Figure 2:
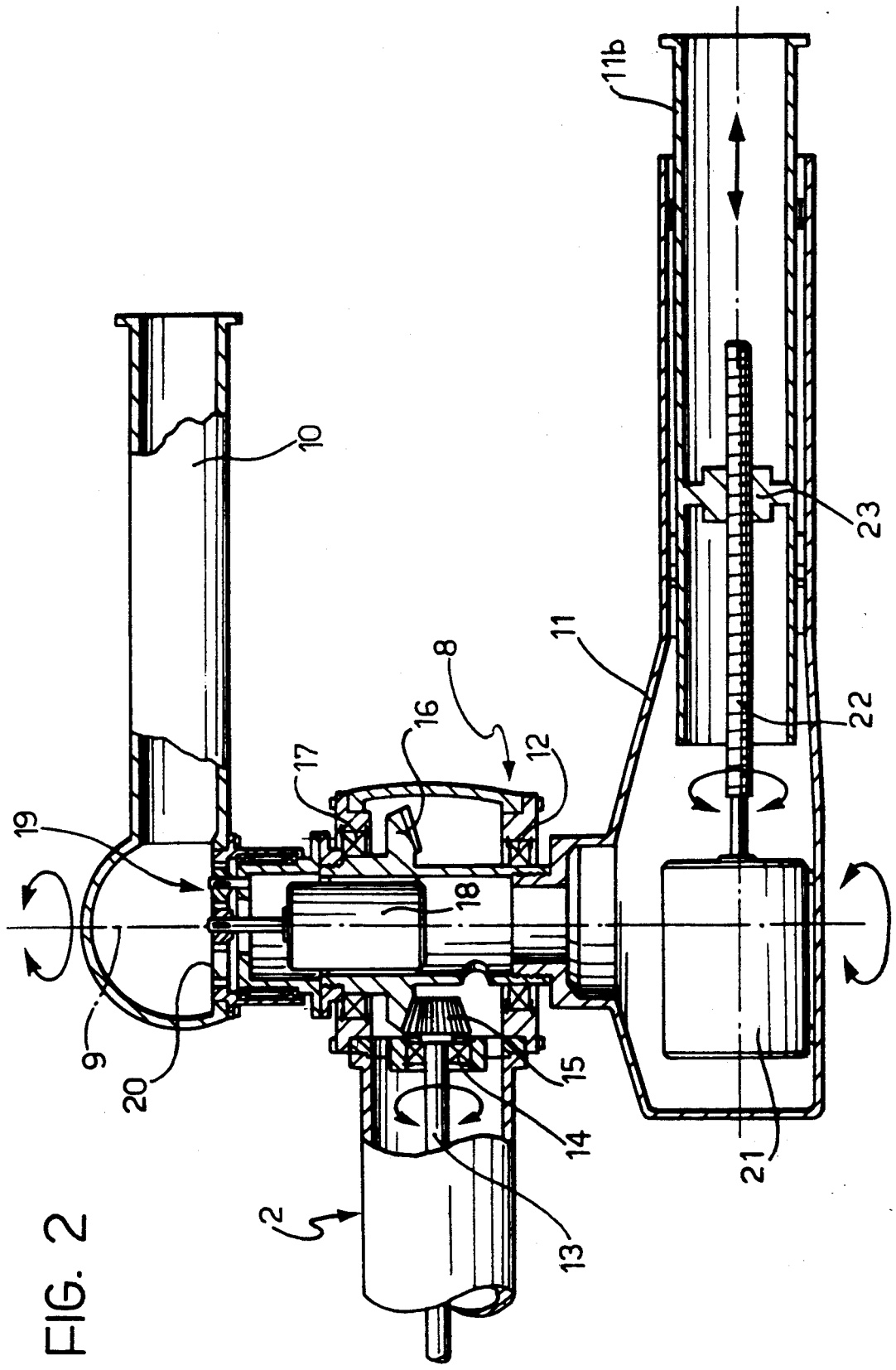
FIG. 2 is a section of part of the robot of FIG. 1.

With reference to FIG. 2, in the embodiment illustrated therein, the structure of the second forearm 11 is supported for rotation on the end casing 8 of the arm 2 by a rolling bearing 12. The forearm 11 is rotated by an electric motor (not visible in the drawings) which is housed in the arm 2 and drives a transmission shaft 13 which is rotatable in bearings 14 in the arm 2. An end of the transmission shaft 13 drives a pair of bevel gears 15, 16, of which the output gear is connected to the structure of the forearm 11. The gear 16 is supported for rotation on the casing 8 by a bearing 17 and in turn supports an electric motor 18 for driving the forearm 10. The output shaft of the motor 18 is in fact connected by an epicyclic reduction unit with gears 19 to a ring gear 20 fixed to the structure of the first forearm 10. A further electric motor 21 in the structure of the second forearm 11 rotates a screw 22 which engages a female thread 23 carried by the extendible portion 11b of the forearm 11. This portion is prevented from rotating and is therefore forced to move axially as a result of the rotation of the screw 22 by the electric motor 21.

The robot according to the invention can be used to advantage for quickly carrying out manipulatory operations such as, for example, the assembly and/or disassembly of mechanical parts. The use of two forearms considerably reduces the times required for any operation (for example, the fitting of a screw in its seat and of the washer associated with the screw) in which various parts have to be picked up and then positioned in a fairly restricted space. Each forearm reduces the dead time by prearranging the next part whilst the other forearm is still working. The telescopic structure of the second forearm also enables its range of operation to be adjusted so as to optimise the assembly cycle and at the same time prevent any interference between the two wrists.

Naturally, the principle of the invention remaining the same, the details of construction and forms of embodiment may be varied widely with respect to those described and illustrated purely by way of example, without thereby departing from the scope of the present invention.

We claim:

1. An articulated robot including an arm having a distal end, a first forearm which is articulated to the arm about an articulation axis and is intended to have an articulated wrist, and means for rotating the first forearm relative to the arm, said robot including a second forearm which is articulated to the arm about the same articulation axis as the first forearm and means for rotating the second forearm which are independent of the means for rotating the first forearm, wherein the distal end of the arm supports for rotation a structure which is fixed to the second forearm and also rigidly supports an electric motor for rotating the first forearm.

2. A robot according to claim 1, wherein the first and second forearms are articulated on opposite sides of the distal end of the arm.

3. A robot according to claim 1, wherein the second forearm has a telescopic structure.

4. A robot according to claim 3, wherein said robot includes an electric motor which controls extension of the telescopic structure of the second forearm by means of a male-and-female thread system.

5. A robot according to claim 4, wherein the means for rotating the second forearm include a transmission shaft disposed coaxially in the arm and connected to the second forearm by a pair of bevel gears.

6. A robot according to claim 5, wherein an output shaft of the electric motor is connected to the first forearm by an epicyclic reduction unit.

* * * * *